(12) United States Patent
Hsieh

(10) Patent No.: US 11,950,027 B2
(45) Date of Patent: Apr. 2, 2024

(54) INTERACTIVE PROJECTION SYSTEM AND OPERATION METHOD THEREOF

(71) Applicant: Coretronic Corporation, Hsin-Chu (TW)

(72) Inventor: Ching-Feng Hsieh, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 18/189,180

(22) Filed: Mar. 23, 2023

(65) Prior Publication Data

US 2023/0308618 A1 Sep. 28, 2023

(30) Foreign Application Priority Data

Mar. 24, 2022 (CN) .......................... 202220672123.X

(51) Int. Cl.
*G06F 3/042* (2006.01)
*H04N 9/31* (2006.01)

(52) U.S. Cl.
CPC ......... *H04N 9/3173* (2013.01); *G06F 3/0421* (2013.01); *H04N 9/312* (2013.01); *H04N 9/3185* (2013.01)

(58) Field of Classification Search
CPC ..... G06F 3/0421; G06F 3/0425; H04N 9/312; H04N 9/3173; H04N 9/3185; H04N 9/3194
See application file for complete search history.

(56) References Cited

U.S. PATENT DOCUMENTS

| | | | | |
|---|---|---|---|---|
| 8,408,720 | B2 * | 4/2013 | Nishigaki | H04N 9/3194 353/34 |
| 10,268,318 | B2 * | 4/2019 | Kang | G06F 1/16 |
| 10,516,864 | B2 * | 12/2019 | Otani | H04N 9/3194 |
| 2013/0307772 | A1 * | 11/2013 | Wu | G06F 3/0386 345/158 |
| 2014/0292647 | A1 * | 10/2014 | Murase | G06F 3/017 345/156 |
| 2016/0283040 | A1 * | 9/2016 | Suzuki | G06F 3/042 |
| 2018/0046324 | A1 * | 2/2018 | Hung | H04N 9/3161 |
| 2023/0185178 | A1 * | 6/2023 | Hsieh | G03B 21/26 353/79 |

FOREIGN PATENT DOCUMENTS

| | | |
|---|---|---|
| CN | 110418122 | 11/2019 |
| TW | I522722 | 2/2016 |

\* cited by examiner

*Primary Examiner* — Joe H Cheng
(74) *Attorney, Agent, or Firm* — JCIPRNET

(57) ABSTRACT

An interactive projection system including a projector and a touch interactive light source device is provided. The projector includes a projection optical engine, a camera module, and a control module. The touch interactive light source device includes at least one infrared light source module and a wireless signal transmission module. The control module is electrically connected to the projection optical engine and the camera module, and controls the touch interactive light source device through the wireless signal transmission module, so that the touch interactive light source device is placed in a recommended installation position and the interactive projection system is in an interactive mode. An operation method of the interactive projection system is also provided.

13 Claims, 5 Drawing Sheets

INTERACTIVE PROJECTION SYSTEM AND OPERATION METHOD THEREOF

CROSS-REFERENCE TO RELATED APPLICATION

This application claims the priority benefit of China application serial no. 202220672123.X, filed on Mar. 24, 2022. The entirety of the above-mentioned patent application is hereby incorporated by reference herein and made a part of this specification.

BACKGROUND

Technical Field

The invention relates to a projection system and an operation method thereof, and more particularly, to an interactive projection system and an operation method thereof.

Description of Related Art

A projection system with a touch function currently on the market includes an infrared light-emitting module and an infrared camera module in addition to a projector. The projector is configured to project an image onto a projection surface. The infrared light-emitting module is configured to emit planar infrared light parallel to a projection target such as the projection surface, a desktop surface, or a wall. When the user's hand or pen touches the projection plane, the infrared light irradiates the user's hand or pen to cause scattering of the infrared light, and the scattered infrared light is received by the infrared camera module. After calculation and comparison, position coordinates corresponding to a projection image may be obtained, so as to achieve a function of interactive touch.

However, the existing projection system with the touch function integrates the projector, the infrared light-emitting module, and the infrared camera module into one device, and has the following problems. Considering that a height of a machine platform should not be too high and hoping that a projection size may be larger, a projection lens needs to be an ultra-short focus lens. However, the ultra-short focus lens is expensive. Due to the integration of various modules in the projection system, the projection size is fixed and cannot be enlarged. In addition, due to the integration of the projection system, the touch function is limited to a specific environment (for example, a desktop). If the touch function is to be used in other environments (such as projection on a wall), the projection system will not be able to provide the touch function.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The invention is directed to an interactive projection system and an operation method thereof, which is adapted to provide a larger projection size, lower cost, and less restriction on a projection surface.

An embodiment of the invention provides an interactive projection system including a projector and a touch interactive light source device. The projector includes a projection optical engine, a camera module, and a control module. The projection optical engine is configured to emit a projection beam toward a projection surface to form a projection range on the projection surface. The touch interactive light source device includes at least one infrared light source module and a wireless signal transmission module. The infrared light source module is configured to generate an infrared light curtain parallel to the projection surface, and is electrically connected to the wireless signal transmission module. The control module is electrically connected to the projection optical engine and the camera module, and controls the touch interactive light source device through the wireless signal transmission module, so that the touch interactive light source device is placed in a recommended installation position and the interactive projection system is in an interactive mode. When an object approaches the projection surface and contacts the infrared light curtain, the control module receives an infrared light beam reflected by the object through the camera module, and identifies a position of the object or a touch position of the object corresponding to the projection range according to the infrared light beam.

In an embodiment of the invention, the touch interactive light source device further includes a visible light source module configured to emit a visible light curtain and electrically connected to the wireless signal transmission module. The control module controls the projection optical engine to generate multiple selection positions on the projection surface, and controls the visible light source module to turn on. When the visible light curtain covers the projection range and is parallel to the infrared light curtain, and after confirming that the object clicks the selection positions in sequence, the control module confirms a touch range of the touch interactive light source device. The control module then turns off the visible light source module and keeps turning on the infrared light source module, so that the interactive projection system is in the interactive mode.

In an embodiment of the invention, the touch interactive light source device further includes an adjustment mechanism configured to adjust positions or/and angles of the infrared light source module and the visible light source module.

In an embodiment of the invention, the touch interactive light source device further includes a battery and a charging circuit. The battery is configured to provide power for the touch interactive light source device. The charging circuit is configured to charge the battery through an external power source.

In an embodiment of the invention, the touch interactive light source device further includes a gravity sensor electrically connected to the wireless signal transmission module. After the touch interactive light source device in the recommended installation position is moved, the gravity sensor sends a reminder signal. The reminder signal is transmitted to the control module of the projector through the wireless signal transmission module. The control module then controls the projection optical engine to remind a user to recalibrate a position of the touch interactive light source device.

In an embodiment of the invention, the control module includes a touch application. When the projector executes the touch application, the projector is controlled by the touch application, and the projector projects an instruction image, so as to adjust the recommended installation position of the touch interactive light source device.

An embodiment of the invention provides an operation method of an interactive projection system. The interactive projection system includes a projector and a touch interactive light source device. The projector includes a projection optical engine, a camera module, and a control module. The operation method of the interactive projection system includes following steps. The projection optical engine of the projector emits a projection beam toward a projection surface to form a projection range on the projection surface. The projection optical engine receives an instruction signal from the control module of the projector to generate an instruction image on the projection surface. The instruction image includes multiple recommended installation positions, a start instruction, touch calibration, and a warning signal. The projection optical engine generates the recommended installation positions and the start instruction in the instruction image on the projection surface. After the touch interactive light source device is placed in one of the recommended installation positions, and the touch interactive light source device is activated, the touch interactive light source device is connected with the control module of the projector through the wireless signal transmission module of the touch interactive light source device. The control module controls the touch interactive light source device through the wireless signal transmission module, so that the interactive projection system is in an interactive mode.

In an embodiment of the invention, the step that the interactive projection system is in the interactive mode includes following steps. The control module is configured to control at least one infrared light source module and a visible light source module of the touch interactive light source device through the wireless signal transmission module to emit an infrared light curtain and a visible light curtain parallel to the projection surface. The projection optical engine generates the touch calibration in the instruction image on the projection surface, so as to confirm a touch range of the touch interactive light source device. The control module controls the touch interactive light source device through the wireless signal transmission module to turn off the visible light source module and keep turning on the infrared light source module, so that the interactive projection system is in the interactive mode.

In an embodiment of the invention, the touch calibration includes multiple selection positions. The step of confirming the touch range of the touch interactive light source device includes following steps. The visible light curtain covers the entire projection range and is parallel to the infrared light curtain. An object is used to click the selection positions in sequence. After correction confirmation of the control module, confirmation of the touch range of the touch interactive light source device is achieved. When the object approaches the projection surface and contacts the infrared light curtain, the control module receives an infrared light beam reflected by the object through the camera module of the projector, and identifies a position of the object or a touch position of the object corresponding to the projection range according to the infrared light beam.

In an embodiment of the invention, the step that the visible light curtain covers the projection range and is parallel to the infrared light curtain includes following steps. If the visible light curtain is projected to be non-parallel to the projection surface, an adjustment mechanism of the touch interactive light source device is used to perform adjustment, so that the visible light curtain is parallel to the projection surface.

In an embodiment of the invention, the operation method of the interactive projection system further includes following steps. When the touch interactive light source device in the recommended installation position is moved, a gravity sensor of the touch interactive light source device sends a reminder signal. The reminder signal is transmitted to the control module of the projector through the wireless signal transmission module, and then the projection optical engine regenerates the touch calibration in the instruction image on the projection surface to remind the user to perform re-correction.

In an embodiment of the invention, the operation method of the interactive projection system further includes following steps. The touch interactive light source device uses the wireless signal transmission module to periodically transmit power information of a battery of the touch interactive light source device to the projector. When power of the battery is too low, the control module displays a warning signal on the projection image to remind the user to charge the touch interactive light source device.

In an embodiment of the invention, the control module includes a touch application. When the projector executes the touch application, the projector is controlled by the touch application, and the projector projects an instruction image according to the instruction signal, so as to adjust the recommended installation position of the touch interactive light source device.

Based on the above descriptions, in an embodiment of the invention, in the interactive projection system and the operation method thereof, the touch interactive light source device is connected to the control module of the projector through the wireless signal transmission module, so as to achieve the interactive mode of the interactive projection system. Therefore, the projector and the touch interactive light source device are independent modules from each other, which further reduces the system cost, increases a range of a projection size, and increases the usable situations of the interactive system.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference In the following detailed description of the preferred embodiments, reference is made to the accompanying drawings which form a part hereof, and in which are shown by way of illustration specific embodiments in which the invention may be practiced. In this regard, directional terminology, such as 'top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
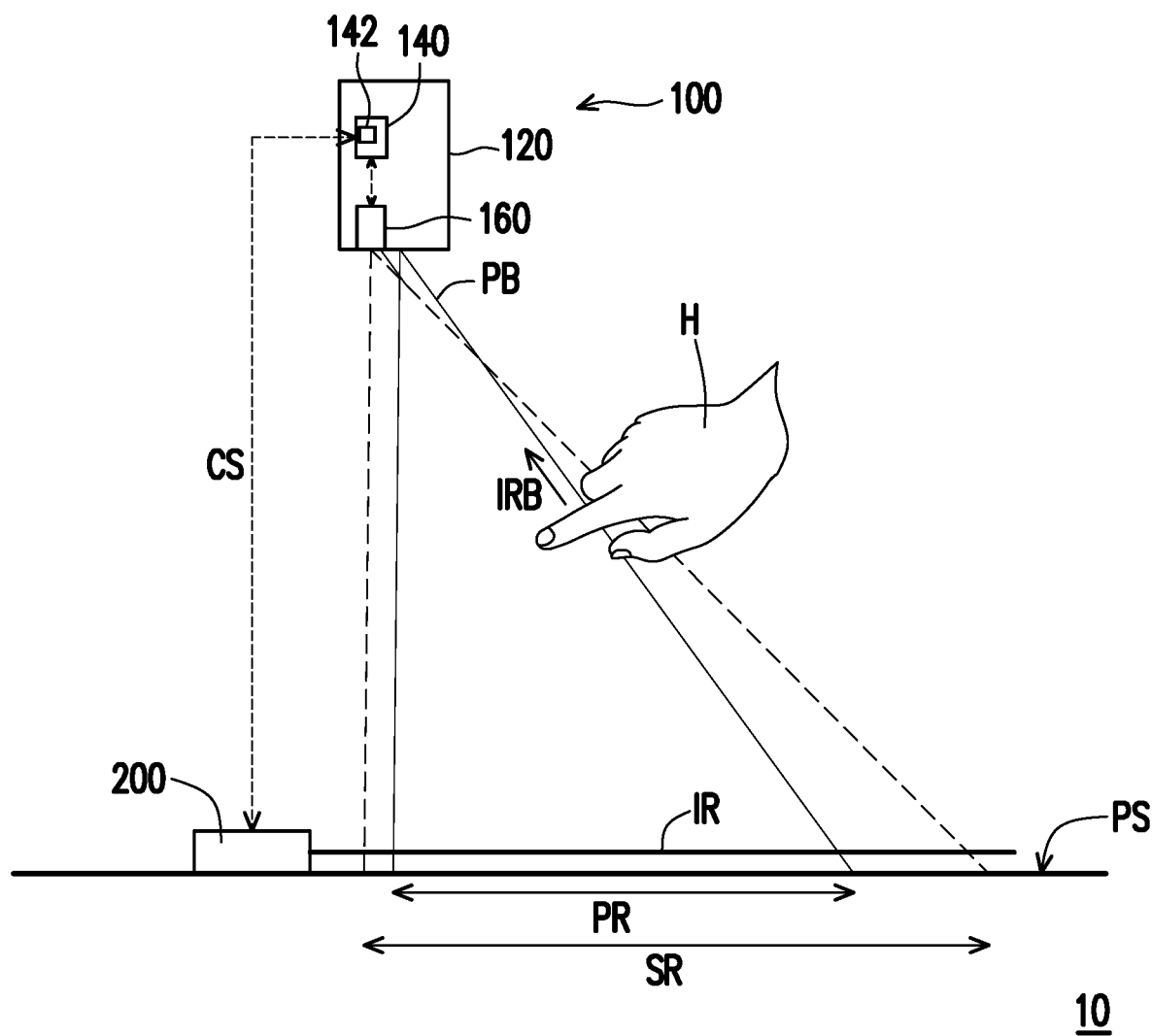
FIG. 1 is a schematic diagram of an interactive projection system according to an embodiment of the invention.
Figure 2:
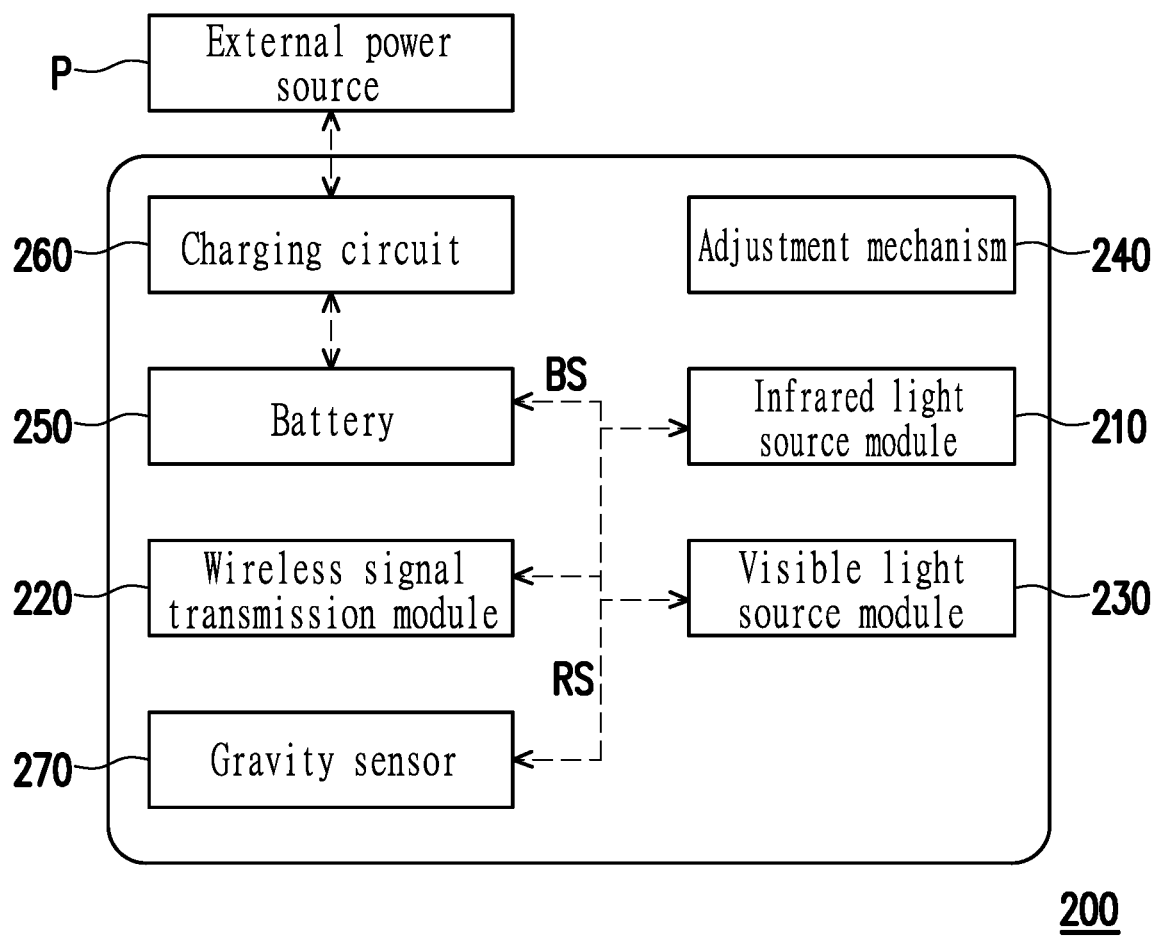
FIG. 2 is a schematic diagram of a touch interactive light source device of an interactive projection system according to an embodiment of the invention.

FIG. 1 is a schematic diagram of an interactive projection system according to an embodiment of the invention. FIG. 2 is a schematic diagram of a touch interactive light source device of an interactive projection system according to an embodiment of the invention. Referring to FIG. 1 and FIG. 2, an embodiment of the invention provides an interactive projection system 10 and an operation method thereof. The interactive projection system 10 includes a projector 100 and a touch interactive light source device 200. The projector 100 includes a projection optical engine 120, a camera module 160, and a control module 140.

In the embodiment, the projection optical engine 120 is configured to emit a projection beam PB toward a projection surface PS to form a projection range PR on the projection surface PS. The projection beam PB may be a visible light beam. The projection surface PS may be a desktop, a wall, or a projection curtain, but the invention is not limited thereto. The camera module 160 may be a photo-sensing module such as a thin film transistor (TFT), a complementary metal-oxide-semiconductor (CMOS), or a charge coupled device (CCD).

In the embodiment, the touch interactive light source device 200 includes at least one infrared light source module 210 and a wireless signal transmission module 220. The infrared light source module 210 is, for example, formed by a light-emitting element such as an infrared light-emitting diode (LED) or an infrared laser diode (LD), etc. The wireless signal transmission module 220 is, for example, a Bluetooth signal transmission module, a ZigBee signal transmission module, an ANT+ signal transmission module, or a Wi-Fi signal transmission module, but the invention is not limited thereto.

In the embodiment, the infrared light source module 210 is configured to generate an infrared light curtain IR parallel to the projection surface PS, and is electrically connected to the wireless signal transmission module 220. The camera module 160 is suitable for performing sensing toward the projection surface PS, and receiving infrared light within a sensing range SR. The sensing range SR is preferably greater than or equal to the projection range PR. The control module 140 is electrically connected to the projector 120 and the camera module 160. The touch interactive light source device 200 is connected to the projector 100 through the wireless signal transmission module 220. In addition, the touch interactive light source device 200 is controlled by the projector 100, so that the touch interactive light source device 200 is disposed in a recommended installation position provided by the projector 100, and the interactive projection system 10 is in an interactive mode. When an object H (such as a finger or a pen) approaches to or touches the projection surface PS, the object H contacts the infrared light curtain IR and an infrared light beam IRB is reflected by the object H. The control module 140 receives the infrared light beam IRB reflected by the object H through the camera module 160, and identifies a position of the object H or a touch position of the object H corresponding to the projection range PR according to the infrared light beam IRB. Further, the infrared light source module 210 includes, for example, at least one light-emitting element and a light-diffusing element, the infrared light emitted by the light-emitting element may generate a planar light curtain after passing through the light-diffusing element, but the invention is not limited thereto.

In the embodiment, the touch interactive light source device 200 further includes a visible light source module 230. The visible light source module 230 is, for example, composed of a light-emitting diode or a laser diode (LD). The visible light source module 230 is used for emitting a visible light curtain (such as a visible light curtain V shown in FIG. 5), and is electrically connected to the wireless signal transmission module 220. The visible light curtain may be a light curtain formed by red light, green light, blue light or other colored light. The infrared light curtain IR emitted by the infrared light source module 210 and the visible light curtain V emitted by the visible light source module 230 of the touch interactive light source device 200 need to be parallel to each other or overlapped with each other, for example.

In the embodiment, the control module 140 of the projector 100 controls the projection optical engine 120 to project an image with multiple selection positions (selection positions SP indicated by circles in FIG. 6) on the projection surface PS, and controls the visible light source module 230 of the touch interactive light source device 200 to turn on. The visible light curtain generated by the visible light source module 230 covers the projection range PR and is parallel to the infrared light curtain IR, and after confirming that the object H has clicked the selection positions SP in sequence, the control module 140 confirms that the touch interactive light source device 200 has been placed at the recommended installation position and confirms a touch range of the touch interactive light source device 200. The control module 140 then turns off the visible light source module 230 and keeps turning on the infrared light source module 210, so that the interactive projection system 10 is in the interactive mode.

In the embodiment, the touch interactive light source device 200 further includes an adjustment mechanism 240 for adjusting positions or angles of the infrared light source module 210 and the visible light source module 230, so that the infrared light curtain IR emitted by the infrared light source module 210 and the visible light curtain emitted by the visible light source module 230 is adjusted to be parallel to the projection surface PS.

In the embodiment, the touch interactive light source device 200 further includes a battery 250 and a charging circuit 260. The battery 250 is electrically connected to the charging circuit 260, the infrared light source module 210, the visible light source module 230 and the wireless signal transmission module 220. The battery 250 is configured to provide power for the touch interactive light source device 200 to operate. The charging circuit 260 is configured to charge the battery 250 by using an external power source P.

In the embodiment, the touch interactive light source device 200 further includes a gravity sensor 270 electrically connected to the wireless signal transmission module 220 and the battery 250. After the touch interactive light source device 200 in the recommended installation position is moved, the gravity sensor 270 sends a reminder signal RS. The reminder signal RS is transmitted to the control module 140 of the projector 100 through the wireless signal transmission module 220. The control module 140 then controls the projection optical engine 120 to remind the user to recalibrate the position of the touch interactive light source device 200. The control module 140, for example, controls the projection optical engine 120 to project an image with a reminder text to remind the user to re-adjust the position of the touch interactive light source device 200.

Besides, the control module 140, for example, includes a microcontroller unit (MCU), a central processing unit (CPU), a microprocessor, a digital signal processor (DSP), a programmable controller, a programmable logic device (PLD), or other similar devices or a combination of these devices, and the invention is not limited thereto. In addition, in an embodiment, the various functions of the control module 140 may be implemented as multiple codes (for example, a touch application 142 in FIG. 1). These codes are stored in a memory, and are executed by the control module 140. Alternatively, in an embodiment, the various functions of the control module 140 may be implemented as one or more circuits. The invention does not limit the use of software or hardware to implement the functions of the control module 140.

Figure 3:
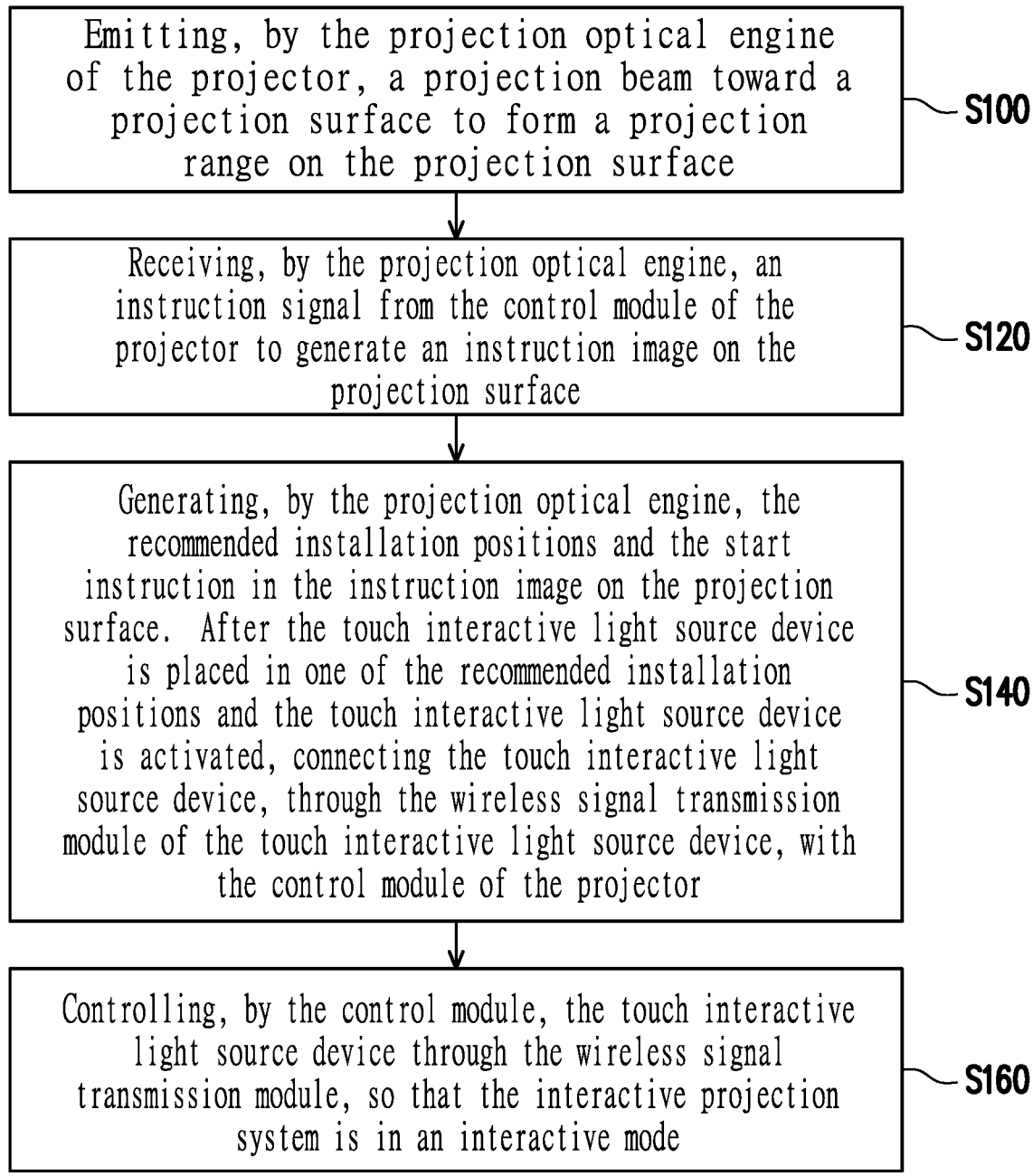
FIG. 3 is a flowchart of an operation method of an interactive projection system according to an embodiment of the invention.
Figure 4:
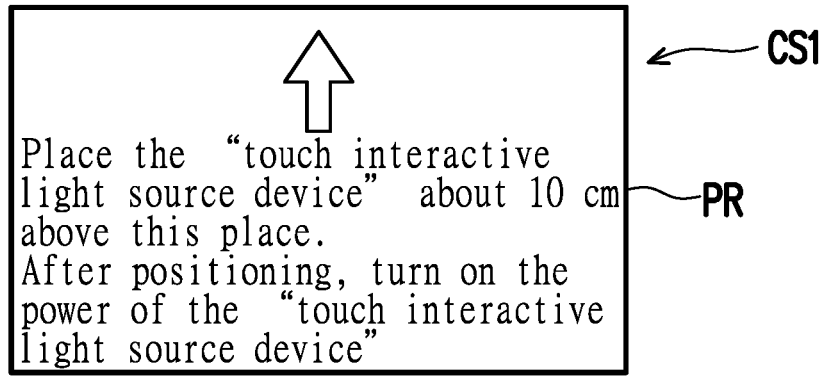
FIG. 4, FIG. 5, and FIG. 6 are schematic diagrams illustrating different steps of generating an instruction image on a projection surface in an operation method of an interactive projection system according to an embodiment of the invention.
Figure 5:
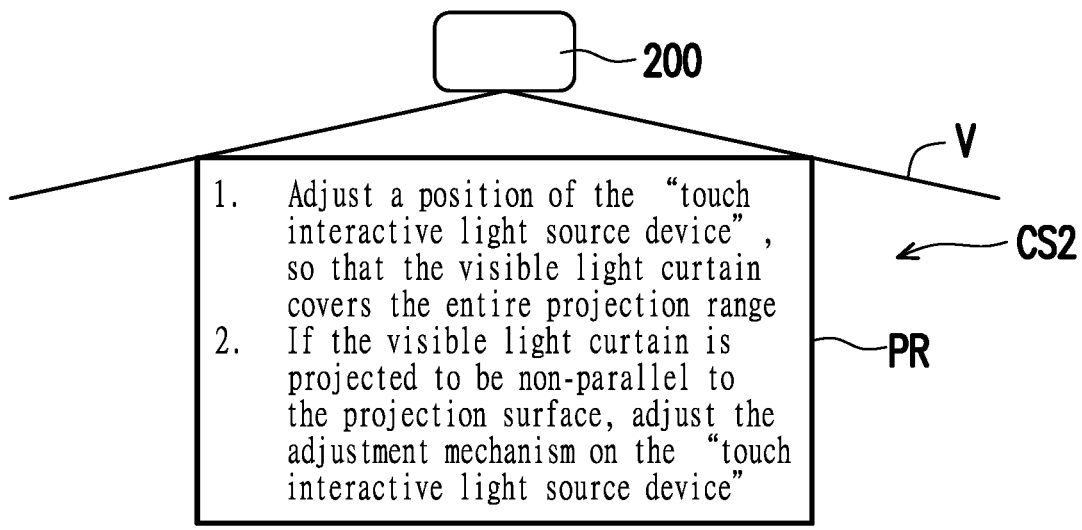
Figure 6:
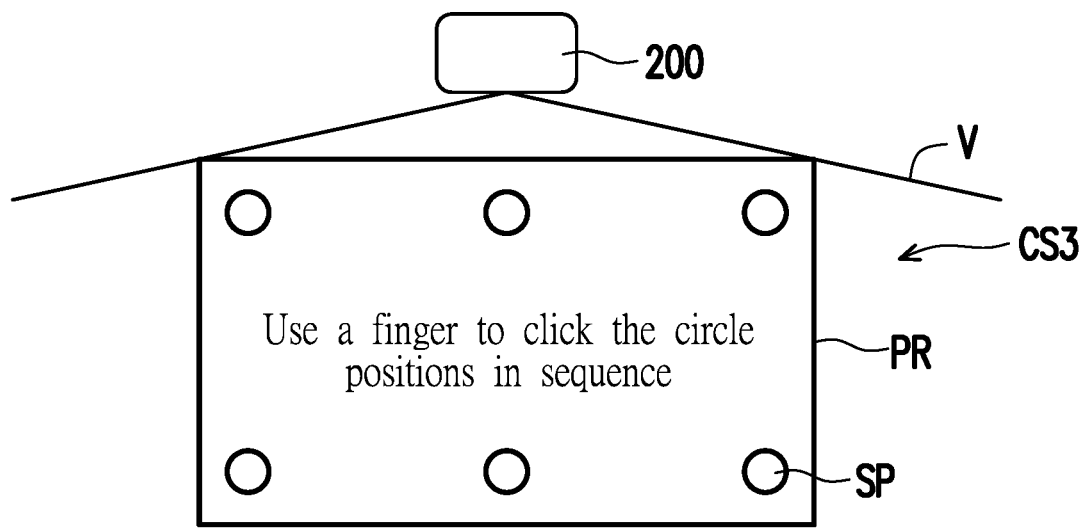

FIG. 3 is a flowchart of an operation method of an interactive projection system according to an embodiment of the invention. FIG. 4, FIG. 5, and FIG. 6 are schematic diagrams illustrating different steps of generating an instruction image on a projection surface in an operation method of an interactive projection system according to an embodiment of the invention. Referring to FIG. 1 to FIG. 6 together, in the embodiment, the operation method of the interactive projection system 10 includes following steps. In step S100, the projection optical engine 120 of the projector 100 emits the projection beam PB toward the projection surface PS to form the projection range PR on the projection surface PS. Further, the projection optical engine 120 of the projector 100 may adjust a size of a projected image to define the projection range PR, and starts to execute the touch application 142 of the control module 140. In step S120, the projection optical engine 120 receives an instruction signal CS from the control module 140 of the projector 100 to generate instruction images CS1, CS2 and CS3 on the projection surface, where the instruction images include multiple recommended installation positions, a start instruction, an adjustment instruction, touch calibration (shown in FIG. 5 and FIG. 6) and a warning signal. In step S140, the recommended installation position and the start instruction in the instruction image CS1 are presented on the projection surface, as shown in FIG. 4. The touch application 142 of the control module 140 controls the projection optical engine 120 to generate the instruction image CS1 on the projection surface, where the instruction image CS1 includes instruction content of the recommended installation position (such as a direction and a distance) of the touch interactive light source device 200 and asking the user to turn on the power of the touch interactive light source device 200. After the touch interactive light source device 200 is placed at one of the recommended installation positions and the power of the touch interactive light source device 200 is activated, the touch interactive light source device 200 is connected with the control module 140 of the projector 100 through the wireless signal transmission module 220.

In step S160 of the embodiment, the control module 140 controls the touch interactive light source device 200 through the wireless signal transmission module 220, so as to make the interactive projection system 10 to be in the interactive mode. The step of making the interactive projection system 10 to be in the interactive mode includes following steps. The touch application 142 of the control module 140 activates the infrared light source module 210 and the visible light source module 230 through the wireless signal transmission module 220 of the interactive light source device 200, and controls the infrared light source module 210 and the visible light source module 230 to emit the infrared light curtain IR and the visible light curtain V parallel to the projection surface PS. The touch application 142 of the control module 140 controls the projection optical engine 120 to generate the instruction image CS2 on the projection surface, where the instruction image CS2 is an adjustment instruction asking the user to adjust the visible light curtain V to cover the entire projection range PR and asking the user to adjust the visible light curtain V to be parallel to the projection surface. Then, the touch application 142 of the control module 140 controls the projection optical engine 120 to generate the instruction image CS3 on the projection surface, where the instruction image CS3 is a touch calibration for asking the user to confirm the touch range of the touch interactive light source device 200 according to an image icon or text, as shown in FIG. 5 and FIG. 6. Then, the touch application 142 of the control module 140 controls to turn off the visible light source module 230 and keeps turning on the infrared light source module 210 through the wireless signal transmission module 220 of the touch interactive light source device 200, so that the interactive projection system 10 is in the interactive mode.

In the embodiment, the instruction image CS3 used in the above touch calibration includes multiple selection positions SP, where the selection positions SP are indicated by circles in FIG. 6, but the invention is not limited thereto. The above-mentioned placing the touch interactive light source device 200 in the recommended installation position includes following steps. The visible light curtain V covers the entire projection range PR and is parallel to the infrared light curtain IR, as shown in FIG. 5. The object H is used to sequentially click the selection positions SP to confirm the touch range of the touch interactive light source device 200, as shown in FIG. 6. After correction confirmation of the control module 140, the touch interaction light source device 200 is in a state where the touch interaction may be performed.

In the embodiment, the above step of making the visible light curtain V to cover the projection range PR and be parallel to the infrared light curtain IR includes the following steps. If the visible light curtain V is projected to be non-parallel to the projection surface PS, the adjustment mechanism 240 of the touch interactive light source device 200 is used to adjust the visible light curtain V to be parallel to the projection surface PS, where the adjustment mechanism 240 includes, for example, mechanical components such as screws, threaded rods or/and gears, and the adjustment mechanism 240 is connected to the infrared light source module 210 and the visible light source module 230. When the user moves the infrared light source module 210 and the visible light source module 230 through the adjustment mechanism 240, the positions and angles of the infrared light curtain IR and the visible light curtain V relative to the projection surface may be adjusted correspondingly.

In the embodiment, the operation method of the interactive projection system 10 further includes following steps. When the touch interactive light source device 200 at the recommended installation position is moved, the gravity sensor 270 of the touch interactive light source device 200 sends a reminder signal RS. The reminder signal RS is transmitted to the control module 140 of the projector 100 through the wireless signal transmission module 220, and the touch application 142 of the control module 140 then controls the projector 120 to generate an instruction image on the projection surface to re-execute the adjustment instruction and touch calibration (such as the image in FIG. 5 or FIG. 6).

In the embodiment, the operating method of the interactive projection system 10 further includes following steps. The touch interactive light source device 200 uses the wireless signal transmission module 220 to periodically transmit power information BS of the battery 250 of the touch interactive light source device 200 to the projector 100. When the power of the battery 250 is too low, the control module 140 controls the projection optical engine 120 to project an image showing a warning signal to remind the user to charge the touch interactive light source device 200.

In summary, in an embodiment of the invention, in the interactive projection system and the operation method thereof, the touch interactive light source device is connected to the control module of the projector through the wireless signal transmission module. Then, the control module controls the touch interactive light source device through the wireless signal transmission module, so as to make the interactive projection system to be in the interactive mode. Therefore, the projector and the touch interactive light source device are independent modules from each other. Since the projector is an independent device, setting flexibility thereof is increased, so that the projector may use a general focal length lens with lower cost. The increase of the setting flexibility of the projector increases a range of an allowable distance between the projector and the projection surface, and therefore a size range of the projected image is increased. In addition, the touch interactive light source device is an independent device, so that the projection surface is no longer limited to a desktop. For example, when the projection surface is a desktop, the interactive projection system may be used for desktop touch interaction; if the projection surface is a wall or a whiteboard, the interactive projection system may be used for wall or whiteboard touch interaction. At the same time, the touch interactive light source device is an independent device and may be designed to be portable or convenient for storage.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An interactive projection system, comprising a projector and a touch interactive light source device, wherein:

the projector comprises a projection optical engine, a camera module, and a control module, the projection optical engine is configured to emit a projection beam toward a projection surface to form a projection range on the projection surface;

the touch interactive light source device comprises at least one infrared light source module and a wireless signal transmission module, wherein the at least one infrared light source module is configured to generate an infrared light curtain parallel to the projection surface, and is electrically connected to the wireless signal transmission module; and the control module is electrically connected to the projection optical engine and the camera module, and controls the touch interactive light source device through the wireless signal transmission module, so that the touch interactive light source device is placed in a recommended installation position and the interactive projection system is in an interactive mode, wherein when an object approaches the projection surface and contacts the infrared light curtain, the control module receives an infrared light beam reflected by the object through the camera module, and identifies a position of the object or a touch position of the object corresponding to the projection range according to the infrared light beam.

2. The interactive projection system according to claim 1, wherein the touch interactive light source device further comprises a visible light source module configured to emit a visible light curtain and electrically connected to the wireless signal transmission module, wherein the control module controls the projection optical engine to generate a plurality of selection positions on the projection surface, and controls the visible light source module to turn on, when the visible light curtain covers the projection range and is parallel to the infrared light curtain, and after confirming that the object clicks the selection positions in sequence, the control module confirms a touch range of the touch interactive light source device, the control module then turns off the visible light source module and keeps turning on the at least one infrared light source module, so that the interactive projection system is in the interactive mode.

3. The interactive projection system according to claim 2, wherein the touch interactive light source device further comprises an adjustment mechanism configured to adjusted positions or/and angles of the at least one infrared light source module and the visible light source module.

4. The interactive projection system according to claim 1, wherein the touch interactive light source device further comprises a battery and a charging circuit, the battery is configured to provide power for the touch interactive light source device, and the charging circuit is configured to charge the battery through an external power source.

5. The interactive projection system according to claim 1, wherein the touch interactive light source device further comprises a gravity sensor electrically connected to the wireless signal transmission module, wherein after the touch interactive light source device in the recommended installation position is moved, the gravity sensor sends a reminder signal, the reminder signal is transmitted to the control module of the projector through the wireless signal transmission module, and the control module then controls the projection optical engine to remind a user to recalibrate a position of the touch interactive light source device.

6. The interactive projection system according to claim 1, wherein the control module comprises a touch application, when the projector executes the touch application, the projector is controlled by the touch application, and the projector projects an instruction image, so as to adjust the recommended installation position of the touch interactive light source device.

7. An operation method of an interactive projection system, wherein the interactive projection system comprises a projector and a touch interactive light source device, the projector comprises a projection optical engine, a camera module, and a control module, and the operation method comprises:

emitting, by the projection optical engine of the projector, a projection beam toward a projection surface to form a projection range on the projection surface;

receiving, by the projection optical engine, an instruction signal from the control module of the projector to generate an instruction image on the projection surface, wherein the instruction image comprises a plurality of recommended installation positions, a start instruction, touch calibration, and a warning signal;

generating, by the projection optical engine, the recommended installation positions and the start instruction in the instruction image on the projection surface, and connecting the touch interactive light source device, through a wireless signal transmission module of the touch interactive light source device, with the control module of the projector after the touch interactive light source device is placed in one of the recommended installation positions and the touch interactive light source device is activated; and controlling, by the control module, the touch interactive light source device through the wireless signal transmission module, so that the interactive projection system is in an interactive mode.

8. The operation method of the interactive projection system according to claim 7, wherein the step that the interactive projection system is in the interactive mode comprises:

controlling, by the control module, at least one infrared light source module and a visible light source module of the touch interactive light source device through the wireless signal transmission module to emit an infrared light curtain and a visible light curtain parallel to the projection surface;

generating, by the projection optical engine, the touch calibration in the instruction image on the projection surface to confirm a touch range of the touch interactive light source device; and controlling, by the control module, the touch interactive light source device through the wireless signal transmission module to turn off the visible light source module and keep turning on the at least one infrared light source module, so that the interactive projection system is in the interactive mode.

9. The operation method of the interactive projection system according to claim 8, wherein the touch calibration comprises a plurality of selection positions, and the step of confirming the touch range of the touch interactive light source device comprises:

covering, by the visible light curtain, the entire projection range, and enabling the visible light curtain to be parallel to the infrared light curtain; and using an object to click the selection positions in sequence, and achieving confirmation of the touch range of the touch interactive light source device after correction confirmation of the control module, wherein when the object approaches the projection surface and contacts the infrared light curtain, the control module receives an infrared light beam reflected by the object through the camera module of the projector, and identifies a position of the object or a touch position of the object corresponding to the projection range according to the infrared light beam.

10. The operation method of the interactive projection system according to claim 9, wherein the step that the visible light curtain covers the projection range and is parallel to the infrared light curtain comprises:

if the visible light curtain is projected to be non-parallel to the projection surface, using an adjustment mechanism of the touch interactive light source device to perform adjustment, so that the visible light curtain is parallel to the projection surface.

11. The operation method of the interactive projection system according to claim 7, further comprising:

when the touch interactive light source device in the recommended installation position is moved, sending a reminder signal by a gravity sensor of the touch interactive light source device, wherein the reminder signal is transmitted to the control module of the projector through the wireless signal transmission module, and the projection optical engine regenerates the touch calibration in the instruction image on the projection surface to remind a user to perform recalibration.

12. The operation method of the interactive projection system according to claim 7, further comprising:
using, by the touch interactive light source device, the wireless signal transmission module to periodically transmit power information of a battery of the touch interactive light source device to the projector; and
when power of the battery is too low, displaying, by the control module, the warning signal on the instruction image to remind a user to charge the touch interactive light source device.

13. The operation method of the interactive projection system according to claim 7, wherein the control module comprises a touch application, when the projector executes the touch application, the projector is controlled by the touch application, and the projector projects the instruction image according to the instruction signal, so as to adjust the recommended installation position of the touch interactive light source device.

\* \* \* \* \*